United States Patent [19]

Irwin

[11] Patent Number: 4,496,712
[45] Date of Patent: Jan. 29, 1985

[54] OPTICALLY ANISOTROPIC MELT FORMING COPOLYESTERS

[75] Inventor: Robert S. Irwin, Wilmington, Del.

[73] Assignee: E. I. Du Pont de Nemours and Company, Wilmington, Del.

[21] Appl. No.: 562,116

[22] Filed: Dec. 16, 1983

[51] Int. Cl.$^3$ .............................................. C08G 63/60
[52] U.S. Cl. .................................. 528/191; 528/176; 528/193; 528/194; 528/271
[58] Field of Search ............... 528/190, 191, 193, 194, 528/271, 176

[56] References Cited

U.S. PATENT DOCUMENTS

| | | | |
|---|---|---|---|
| 3,991,014 | 11/1976 | Kleinschuster | 528/176 |
| 4,066,620 | 1/1978 | Kleinschuster et al. | 528/193 |
| 4,118,372 | 10/1978 | Schaefgen | 528/193 |
| 4,183,895 | 1/1980 | Luise | 528/191 |
| 4,269,965 | 5/1981 | Irwin | 528/193 |
| 4,360,658 | 11/1982 | Jackson, Jr. et al. | 528/193 |
| 4,412,058 | 10/1983 | Siemionko | 528/194 |

FOREIGN PATENT DOCUMENTS 55-133423 10/1980 Japan .

*Primary Examiner*—Lester L. Lee

[57] ABSTRACT

Copolyesters useful for fibers from certain monosubstituted hydroquinones, terephthalic acid and certain disubstituted diphenyl ethers.

9 Claims, No Drawings

OPTICALLY ANISOTROPIC MELT FORMING COPOLYESTERS

BACKGROUND OF THE INVENTION

1. Field of the Invention

This invention provides novel fiber-forming, melt-spinnable wholly aromatic copolyesters prepared from certain monosubstituted hydroquinones, terephthalic acid and a member of the group consisting of 3,4'-dicarboxydiphenyl ether, 3,4'-dihydroxydiphenyl ether, 3-hydroxy-4'-carboxydiphenyl ether and 4-hydroxy-3'-carboxydiphenyl ether. These copolyesters are useful for preparation of filaments having high tenacity and/or high modulus. They are also useful for extrusion molded or injection molded products and for preparation of tough films.

2. Description of the Prior Art

Aromatic copolyesters capable of forming optically anisotropic melts are well known in the art. These polymers have yielded heat-treated fibers with properties that are especially useful in tire cords or drive belts. The provision of novel copolyesters for these purposes is deemed a worthwhile objective.

SUMMARY OF THE INVENTION

The present invention is directed to melt-spinnable copolyesters of fiber-forming molecular weight that exhibit optical anisotropy in the melt and consist essentially of Units I, II and III, said units having the structural formulas:

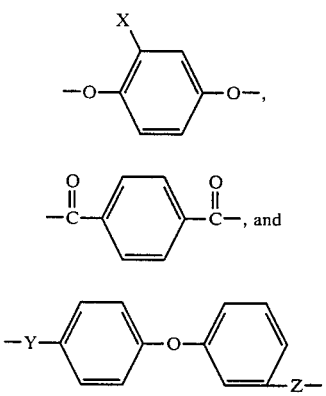

where X is selected from the group consisting of halo (preferably chloro), lower alkyl (preferably methyl) or aryl (preferably phenyl); Y and Z are independently selected from the group consisting of oxygen and carbonyl; and where Units I and II are each present in the amount of from about 30 to 50 mol % and Unit III is present in the amount of from about 5 to 20 mol %. In each case the number of dioxy units in the copolyester is substantially equal to the number of dicarbonyl units. Melt-spun and heat-strengthened filaments of such polyesters as well as films and molded or extruded articles from such polyesters are included in the invention.

DETAILED DESCRIPTION OF THE INVENTION

Unit I in the copolyesters of the invention is lower alkyl-, halo-, or aryl-1,4-dioxyphenylene. Methyl and chloror-groups exemplify the preferred lower alkyl and halo-groups, respectively. Unit II is the terephthaloyl radical. Unit III is:
3,4'-dicarbonyldiphenyl ether (DCDPE);
3,4'-dioxydiphenyl ether (DHDPE);
3-oxy-4'-carbonyldiphenyl ether (HCDPE) or
4-oxy-3'-carbonyldiphenyl ether (CHDPE).

The number of dioxy units present in the copolyester is substantially equal to the number of dicarbonyl units. Mole % is calculated on the basis of total moles of units present, i.e. [I+II+III].

Suitable precursors for Unit I include the corresponding substituted hydroquinone, generally employed in the form of the diacetate. Terephthalic acid is a suitable precursor for Unit II. The diacetate of DHDPE or the monoacetate of HCDPE or CHDPE are ordinarily used to provide Unit III.

The precursor reactants are generally combined in proportions corresponding to the molar proportions of the units desired in the copolyester products except that it is preferred to use a molar excess, indicated in the examples as (%) of the more volatile diacetate of the substituted hydroquinone.

Conventional polymerization techniques may be employed such as described in U.S. Pat. No. 4,118,372 and more particularly in the examples described below. In general, a mixture of monomers is heated with stirring, under nitrogen in a 250 ml 3-necked flask or polymerization tube in a Wood's metal bath or other suitable heating medium to approximately 310°-380° C. Polymerization is continued for up to a total of 0.5 to one hour or longer if necessary until a polymer of fiber-forming molecular weight is obtained. Usually a vacuum is applied to obtain a final product with high molecular weight. The copolyesters of the invention exhibit optical anisotropy in the melt as described in U.S. Pat. No. 4,118,372.

Filament Preparation

The copolyesters of the invention are spun into filaments by conventional melt-spinning at temperatures below decomposition temperatures usually less than 360° C. In the examples below, filaments were prepared by melt-spinning into a quenching atmosphere and collected at a windup speed specified in the example. Melt pumping speed is adjusted to give the approximate linear density (tex) shown in the tables at the stated windup rate.

As used herein, the term "as-spun fiber" refers to a fiber which has not been drawn or heat treated after extrusion and normal windup.

Heat Treatment and Utility

Following collection, samples of undrawn (as-spun) monofilament are heat-treated in essentially relaxed condition in an oven as taught in Luise U.S. Pat. No. 4,183,895. Heating is in a nitrogen atmosphere. The temperature is typically increased in stages from room temperature to a final temperature, which is usually that needed for the optimum development of high tenacity and break elongation.

Molecular weight growth during heat treatment can increase the flow temperature of the filaments (see U.S. Pat. No. 4,118,372), making possible heat treatment temperatures in excess of the original polymer flow temperature. The maximum heat-treatment temperature should be close to or above the initial flow temperature. Higher molecular weights favorably affect the development of high tenacity and break elongation. Higher spin stretch factor also favors the development of high tenacity, break elongation and modulus.

The heat treated fibers of this invention are useful for a variety of applications such as in ropes or in nonwoven sheets, and in reinforcement of plastic composites.

Test Methods

Inherent viscosity ($n_{inh}$), a measure of molecular weight, was computed from $n_{inh} = (\ln n_{rel})/C$ where $n_{rel}$ is the relative viscosity and C is solution concentration in grams of polymer per deciliter of solvent. Relative viscosity is the ratio of polymer solution flow time to solvent flow time in a capillary viscometer at 30° C. The solvent employed was a special mixture coded TM4PP consisting of 7.5% trifluoroacetic acid, 12.5% perchloroethylene, 17.5% methylene chloride, 50% 4-chlorophenol, and 12.5% dichlorotetrafluoroacetone hydrate. The concentrations was 0.5 g polymer per deciliter of solvent.

Monofilament tensile properties were measured in accordance with A.S.T.M. 2101 Part 33 (1980) using a recording stress-strain analyzer at 70° F. (21.1° C.) and 65% relative humidity. Gauge length was 1.0 in (2.54 cm), and rate of elongation 10%/min. Results are reported as T/E/Mi where T is break tenacity in dN/tex, E is elongation-at-break expressed as the percentage by which initial length increased, and Mi is initial tensile modulus in dN/tex. Linear density is reported in tex units. Average tensile properties for five filament samples are reported.

EXAMPLES

The same general procedure was used in all the examples. It should be understood that the best values reported below are believed to be representative of what can be obtained. The data presented do not constitute all the runs performed involving the indicated reactants. Unfamiliarity with the reaction requirements of the system, use of impure reactants or inappropriate heat treatment conditions may have caused the variation in results such as lower tenacity, elongation or modulus to be obtained.

The monomer ingredients are added in substantially the same molar ratios as desired in the final polymer except that an excess (usually 4 to 7%) of acetylated dihydric phenol is generally used. The resultant polymer is identified, for example, as CHQ/TA/HCDPE (42.5/42.5/15) meaning it contained 42.5 mole % of chloro-1,4-dioxyphenylene units (from the diacetate of chlorohydroquinone), 42.5 mole % of terephthaloyl units (from terephthalic acid), and 15 mole % of 3-oxy-4'-carbonyldiphenyl ether units (from the monoacetate). Excesses of acetates are not included in these percentages.

The 3-necked flask or polymer tube was fitted with: (1) a glass stirrer extending through a pressure-tight resin bushing, (2) a nitrogen inlet, and (3) a short column leading to a water- or air-cooled condenser with a flask for collecting acetic acid by-product. An attachment for application of vacuum was provided at the end of the condenser. An electrically heated Wood's metal bath or a boiling liquid vapor bath mounted for vertical adjustment was used for heating. The reaction mixture was heated to increasing temperatures with stirring at atmospheric pressure under nitrogen purge until essentially all the acetic acid had evolved. Then vacuum was applied and pressure was reduced gradually from atmospheric to less than 1 mm of mercury (133.3 Pa). Heating under vacuum at less than 1 mm mercury pressure was then continued until viscosity had increased to a level believed satisfactory for melt-spinning. The cooled and solidified polymer was comminuted, and a portion was molded into a cylindrical plug for melt spinning.

EXAMPLE 1

COPOLYESTER FILAMENTS FROM CHLOROHYDROQUINONE (CHQ), TEREPHTHALIC ACID (TA), 3,4'-DICARBOXYDIPHENYL ETHER (DCDPE)

A polymer with a composition CHQ/TA/DCDPE (50/35/15) was prepared by mixing the following in the polymerization vessel:

24.0 grams CHQ diacetate (0.105 mole including 5% excess), 11.62 grams TA (0.07 mole), and 7.74 grams DCDPE (0.03 mole).

The mixture was heated in the polymerization vessel from 210° C. to 350° C. in 65 minutes at atmospheric pressure under nitrogen purge, then held at 350° C. for seven minutes under vacuum while reducing the pressure from 25 mm to 0.5 mm. The resulting polymer softened on the thermal gradient hot bar at 285° C. and fibers could be pulled from the bar at 300° C. Inherent viscosity in TM4PP was 1.23.

The polymer which formed an optically anisotropic melt was melt spun through a single-hole spinneret with 0.23 mm hole diameter at 331° C. and a windup speed of 600 ypm. The monofilament was heat treated in a nitrogen-purged atmosphere in an essentially relaxed condition starting at a temperature approximately 100° C. below the maximum oven temperature indicated in the table below. The temperature was increased at a rate of 20° C. per hour until the maximum temperature of the heat treatment was reached. It was then held at this temperature for 16 hours. The following tensile properties were obtained for the as-spun fiber and fibers heat-treated at the indicated maximum temperatures:

|  | Max. Temp. | Tex | T | E | Mi |
| --- | --- | --- | --- | --- | --- |
| As-spun | — | 0.76 | 5.9 | 2.0 | 365 |
| Heat-Treated | 283° C. | 0.64 | 13.0 | 3.4 | 368 |
|  | 298° C. | 0.54 | 21.7 | 5.6 | 444 |
| (Best Value) |  |  | (22.9 | 5.7 | 464) |
|  | 305° C. | 0.68 | 15.7 | 4.9 | 312 |
|  | 320° C. | 0.57 | 12.2 | 5.1 | 259 |

EXAMPLE 2

COPOLYESTER FILAMENTS FROM CHLOROHYDROQUINONE, TEREPHTHALIC ACID, AND 3,4'-DIHYDROXYDIPHENYL ETHER (DHDPE)

A polymer with a composition CHQ/DHDPE/TA (37.5/12.5/50) was prepared by mixing the following in the polymerization vessel:

9.00 grams CHQ diacetate (0.0394 mole including 5% excess), 3.76 grams DHDPE diacetate (0.0131 mole including 5% excess), 8.30 grams TA (0.050 mole).

The temperature was raised from 210° C. to 335° C. in 60 minutes at atmospheric pressure under nitrogen, then was heated at 335°–340° C. for 8 minutes while reducing the pressure from 25 mm to 0.2 mm. The resulting polymer on the thermal gradient hot bar softened at 295° C. and at 315° C. fibers could be pulled from the bar.

The polymer which formed an optically anisotropic melt was melt spun through a single-hole spinneret with 0.23 mm hole diameter at a temperature of 324° C. and a windup speed of 600 ypm. The filament was heat treated in a nitrogen purge as in Example 1. The tensile properties were as follows:

|  | Max. Temp. | Tex | T | E | Mi |
|---|---|---|---|---|---|
| As-spun | — | 0.53 | 4.3 | 1.5 | 361 |
| Heat-Treated | 305° C. | 0.59 | 17.1 | 4.6 | 376 |
| (Best Value) |  |  | (18.8 | 5.0 | 394) |
|  | 320° C. | 0.67 | 11.6 | 4.2 | 301 |

EXAMPLE 3

COPOLYESTER FILAMENT FROM CHLOROHYDROQUINONE, TEREPHTHALIC ACID, AND 3-HYDROXY-4'-CARBOXYDIPHENYL ETHER (HCDPE)

A polymer having a composition CHQ/TA/HCDPE (43.75/43.75/12.5) was prepared by mixing the following in the polymerization vessel:

13.12 grams CHQ diacetate (0.0574 mole including 5% excess).
9.08 grams TA (0.0547 mole), and
4.25 grams HCDPE monoacetate (0.0156 mole).

The temperature was raised from 210° C. to 230° C. in 47 minutes at atmospheric pressure under nitrogen, then was raised from 330° to 340° C. in 9 minutes under vacuum while reducing the pressure from 25 mm to 0.2 mm. A resulting polymer on the thermal gradient hot bar softened at 285° C. and at 315° C. fibers could be pulled from the bar.

The polymer which formed an optically anisotropic melt was melt spun through a single-hole spinneret with 0.23 mm hole diameter with a spinning temperature at 324° C. and a windup speed of 600 ypm. The monofilament was heat treated in a nitrogen purge as in Example 1. Tensile properties were as follows:

|  | Max. Temp. | Tex | T | E | Mi |
|---|---|---|---|---|---|
| As-Spun | — | 0.60 | 3.9 | 1.7 | 264 |
| Heat-Treated | 295° C. | 0.48 | 12.0 | 3.9 | 351 |
| (Best Value) |  |  | (15.3 | 4.6 | 380) |

EXAMPLE 4

COPOLYESTER FILAMENT FROM CHLOROHYDROQUINONE, TEREPHTHALIC ACID, AND 3-HYDROXY-4'-CARBOXYDIPHENYL ETHER

A polymer with a composition CHQ/TA/HCDPE (42.5/42.5/15) was prepared by mixing the following in the polymerization vessel:

12.75 grams CHQ diacetate (0.0558 mole including 5% excess),
8.82 grams TA (0.0531 mole), and
5.10 grams HCDPE monoacetate (0.0188 mole).

The temperature was raised from 200° C. to 320° C. in 70 minutes at atmospheric pressure under nitrogen, then was raised from 320° to 330° C. in 11 minutes under vacuum while reducing the pressure from 25 mm to 0.5 mm. The resulting polymer on the thermal gradient hot bar softened at 300° C. and at 310° C. fibers could be pulled from the bar. Inherent viscosity in TM4PP was 1.16.

The polymer which formed an optically anisotropic melt was melt spun through a single-hole spinneret with 0.23 hole diameter at a spinning temperature of 300° C. and a windup speed of 600 ypm. The filament was heat-treated in a nitrogen purge as in Example 1. Tensile properties were as follows:

|  | Max. Temp. | Tex | T | E | Mi |
|---|---|---|---|---|---|
| As-Spun | — | 0.54 | 4.5 | 1.8 | 316 |
| Heat-Treated | 295° C. | 0.58 | 6.5 | 2.9 | 270 |
| (Best Value) |  |  | (10.5 | 4.5 | 270) |

I claim:
1. A copolyester consisting essentially of Units I, II and III, said units having the structural formulas:

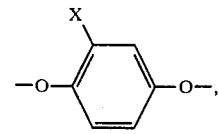 I

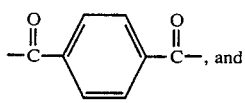 II

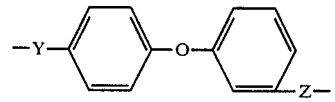 III where X is selected from the group consisting of halo-, lower alkyl, and aryl, Y and Z are independently selected from the group consisting of oxygen and carbonyl; and Units I and II are each present in the amount of from about 30 to 50 mole % and Unit III is present in an amount of from about 5 to 20 mole %.

2. A copolyester according to claim 1 where X is chloro-.

3. A copolyester according to claim 1 where in Unit III, Y and Z are both oxygen.

4. A copolyester according to claim 1 where in Unit III, Y and Z are both carbonyl.

5. A copolyester according to claim 1 where in Unit III, Y is oxygen and Z is carbonyl.

6. A copolyester according to claim 1 where in Unit III, Y is carbonyl and Z is oxygen.

7. A fiber of the copolyester of claim 1.

8. A film of the copolyester of claim 1.

9. A molded or extruded article of the copolyester of claim 1.